(12) United States Patent
Divisi

(10) Patent No.: US 11,821,582 B2
(45) Date of Patent: Nov. 21, 2023

(54) PUMP WITH A LUBRICANT RESERVOIR

(71) Applicant: DROPSA S.p.A., Milan (IT)

(72) Inventor: Walter Divisi, Monaco (MC)

(73) Assignee: DROPSA S.p.A., Milan (IT)

( * ) Notice: Subject to any disclaimer, the term of this patent is extended or adjusted under 35 U.S.C. 154(b) by 0 days.

(21) Appl. No.: 17/956,133

(22) Filed: Sep. 29, 2022

(65) Prior Publication Data

US 2023/0109102 A1 Apr. 6, 2023

(30) Foreign Application Priority Data

Oct. 1, 2021 (IT) .......................... 102021000025223

(51) Int. Cl.
*F16N 7/36* (2006.01)
*F04B 23/02* (2006.01)
*F16N 13/06* (2006.01)

(52) U.S. Cl.
CPC ................ *F16N 7/36* (2013.01); *F04B 23/02* (2013.01); *F16N 13/06* (2013.01); *F05D 2260/98* (2013.01)

(58) Field of Classification Search
CPC .. F16N 7/36; F16N 13/06; F04B 23/02; F04B 15/02; F04B 15/023; F04B 53/18
See application file for complete search history.

(56) References Cited

U.S. PATENT DOCUMENTS

| 2016/0068634 | A1* | 3/2016 | Welch | C07C 51/412 |
| | | | | 528/335 |
| 2016/0312777 | A1* | 10/2016 | Kreutzkaemper | F16N 11/10 |
| 2017/0055760 | A1* | 3/2017 | Burrows | F04B 49/065 |
| 2022/0341543 | A1* | 10/2022 | Kreutzkaemper | F16N 13/02 |
| 2023/0003211 | A1* | 1/2023 | Mouthuy | F04B 53/16 |
| 2023/0109102 | A1* | 4/2023 | Divisi | F04B 23/02 |
| | | | | 184/6 |

FOREIGN PATENT DOCUMENTS

| CN | 111608667 A | 9/2020 |
| DE | 102011053027 A1 | 2/2013 |

* cited by examiner

*Primary Examiner* — Michael A Riegelman
(74) *Attorney, Agent, or Firm* — Dickinson Wright PLLC; Andrew D. Dorisio

(57) ABSTRACT

A pump (1) comprising a lubricant reservoir (3) which feeds at least one pumping element (2), the reservoir (3) being delimited by a base (4) in correspondence with which, inside the reservoir (3) there is a rotating spatula (5) featured, equipped with at least one blade (5A) which, by rotating over the base (4), conveys the said lubricant towards an intake (2A) in the said pumping element (2) pushing the said lubricant through a plurality of passages (4A) made in the surface of the said base (4).

11 Claims, 4 Drawing Sheets

PUMP WITH A LUBRICANT RESERVOIR

This application claims priority to Italian Patent Application for Invention No. 102021000025223 filed on Oct. 1, 2021, the disclosure of which is hereby incorporated by reference.

FIELD OF THE INVENTION

The present invention relates to a pump with a lubricant reservoir.

In particular, it refers to a pump for a lubricant consisting of grease or fluid grease.

BACKGROUND ART

Pumps for lubricants with an integrated reservoir are commonly known, for example that disclosed in EP3276172-A1.

In these kinds of pumps, the lubricant may be quite fluid, such as an oil, or very dense, of the kind such as grease or fluid grease. Conventional pumping elements feature a suction element immersed in the lubricant, and the feeding of the pumping elements depends entirely on the weight of the said lubricant, which essentially slides or flows towards the pumping element intake.

This kind of feeding mechanism can cause problems when using light lubricants if there are lumps, or if there are low temperature conditions, which tend to cause the lubricant to thicken.

Furthermore, in these kinds of pumps, it is somewhat difficult to measure the level of the lubricant contained inside the reservoir. This is due to the density of the said lubricant (normally grease or fluid grease), which tends to densen and jam conventional systems featuring floats or the like.

SUMMARY OF THE INVENTION

The object of the present invention is to provide a pump with a lubricant reservoir which is improved compared to those described in the prior art.

A further object of the invention is to provide a pump with a system for feeding lubricant to at least one pumping element which is safer and more reliable.

This and other objects are achieved by means of a pump with a lubricant reservoir produced according to the technical teachings of the claims annexed hereto.

Advantageously, the invention features a system for detecting when the lubricant present in the reservoir reaches a minimum level.

BRIEF DESCRIPTION OF THE FIGURES

Further features and advantages of the innovation will become clearer in the description of a preferred but not exclusive embodiment of the device, illustrated—by way of a non-limiting example—in the drawings annexed hereto, in which.

DETAILED DESCRIPTION OF THE INVENTION

Figure 1:
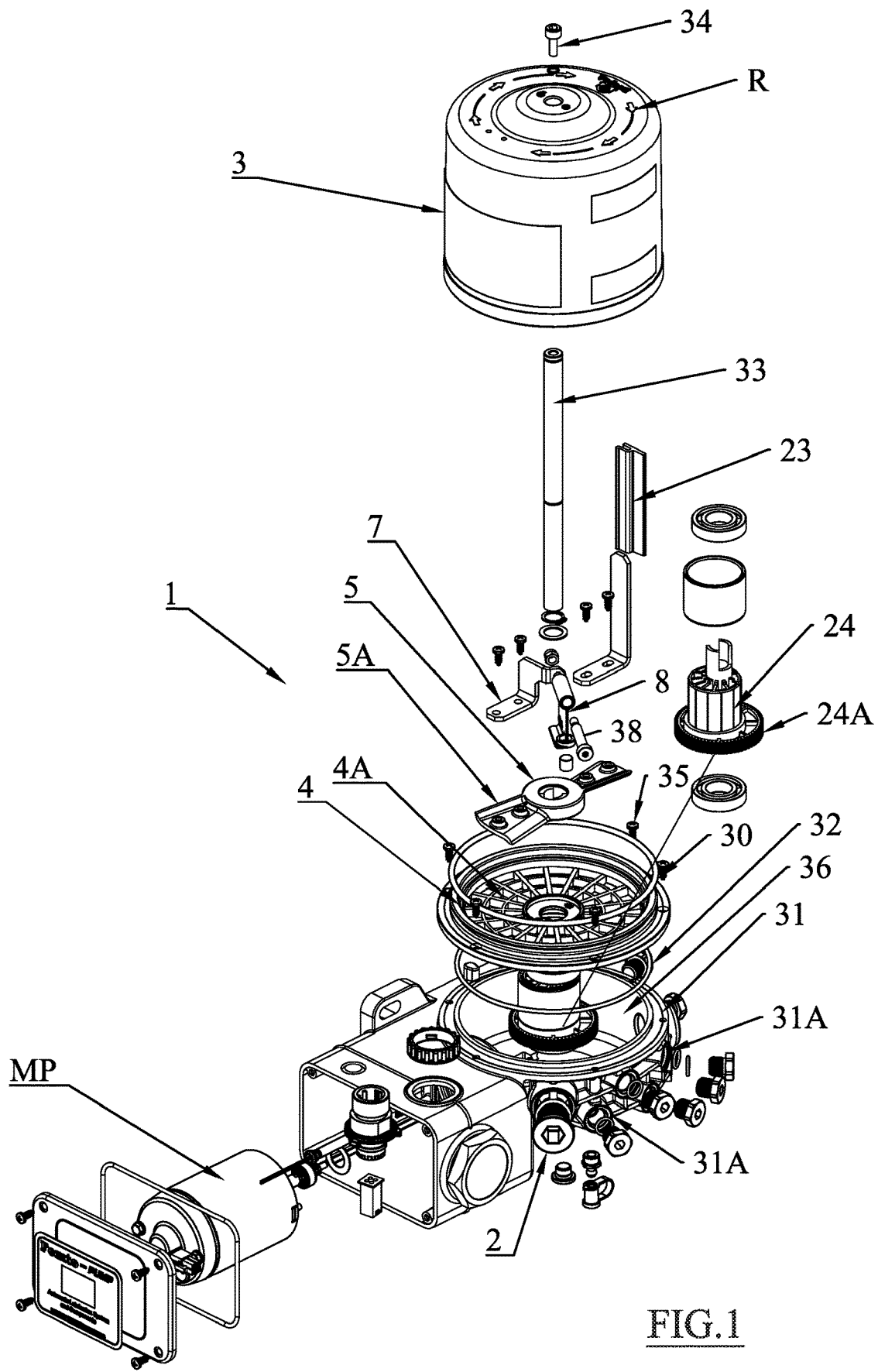
FIG. 1 is an exploded view of the pump with a lubricant reservoir according to the present invention.

With reference to the figures stated, reference number 1 is used to denote, as a whole, a pump with a lubricant reservoir.

The pump 1 comprises a lubricant reservoir 3 which feeds at least one pumping element 2.

The reservoir 3 can be coupled tightly, preferably in a removable way, to a suitably shaped body 31.

An elongated element 33 can protrude from the body 31 to which the reservoir 3 is fastened by means of a screw element 34, preferably positioned in proximity to a sealed (or dome-shaped) end of the said reservoir.

A base 4 can be provided between the reservoir 3 and the body 31 which, when the pump is assembled and in an operative configuration, is located in a lower part of the reservoir 3, i.e. opposite the dome. Essentially, the base delimits the reservoir at the bottom thereof.

Essentially, the force of gravity pushes the lubricant into the reservoir 3, towards the base 4.

The base 4 features a plurality of passages 4A (possibly having a grid configuration) which connect the reservoir 3 with a compartment 36 made in the body 31.

Advantageously, the passages are arranged in a radial pattern, with a smaller surface area towards the centre of the base 4 which increases outwardly towards the perimeter. Each passage 4A is preferably delimited by two radii and by two arcs of circumference with different radii but with the same angle in the centre.

The reservoir 3 can be hermetically sealed to the base 4 (for example, by means of a gasket 30) and the base 4 can be permanently sealed to the body 31 (for example by means of screws 35 and the gasket 32).

Inside the compartment 36, there may be at least one eccentric element 24, which is driven in a rotary manner by a primary motor MP. The eccentric is preferably integral with a toothed crown which engages with a worm screw 37, whose rotation is controlled by said primary motor MP.

The body 31 can feature at least one seat 31A, but preferably a plurality of seats 31A, to house the pumping elements 2. The pumping element 2 is of the conventional kind and can be driven cyclically by the said eccentric element 24.

For example, the pumping element 2 can be screwed into the seat 31A, since the said element is essentially an independent modular body.

Figure 5:
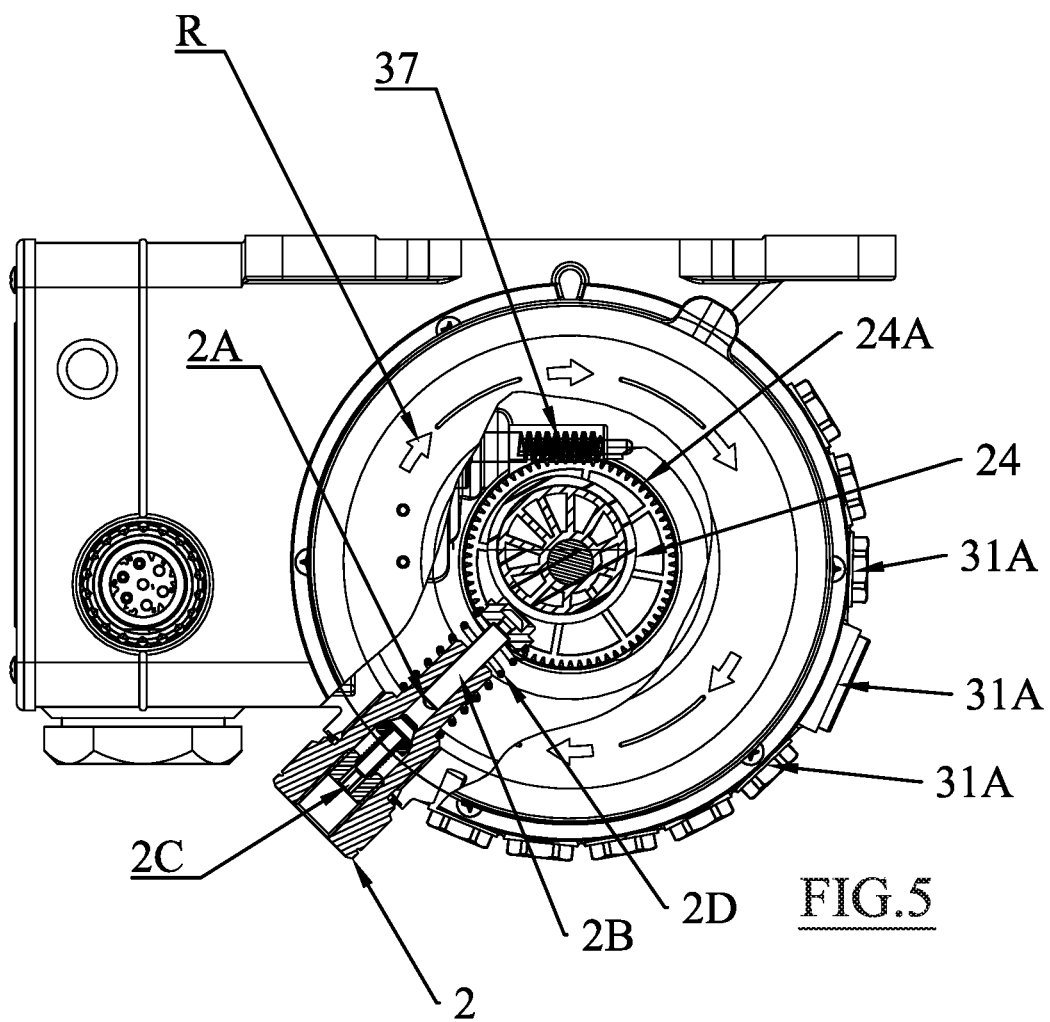
FIG. 5 is a top-down view of the pump in FIG. 4, with a partial section cut away along line V-V in FIG. 4.

The pumping element 2 (FIG. 5) can feature an intake 2A, which is connected with the compartment 36, a piston 2B, which is pressed by a spring 2D against the eccentric element, and a delivery line 2C, which can be connected to a dispensing line.

Obviously, several pumping elements 2 (including therein elements with different pumping volumes) can be featured, all of which can be modularly installed in the pump seats 31A so as to be driven by the eccentric element 24 (or by other eccentric elements which are suitably staggered but torsionally integral therewith, depending on the case and needs). When there are no pumping elements featured in the seats 31A, the said seats are sealed with suitable plugs, as shown in FIG. 1.

A rotating spatula 5 is featured at or in proximity to the base 4, inside the reservoir 3, and therefore on the opposite side of the base 4 to the compartment 36.

Essentially the spatula can rotate very close to the base 4, almost in contact therewith.

The rotating spatula 5 can be torsionally integral with the eccentric element 24 and therefore driven in a rotary motion by the said primary motor (which drives the eccentric element and consequently the pumping element(s)).

The spatula 5 is equipped with at least one blade 5A designed to convey the said lubricant towards an intake 2A in the said pumping element 2 through the plurality of passages 4A in the said base 4 connected with said intake 2A.

Essentially, the blade 5A of the spatula 5 pushes the lubricant across the base 4, and therefore, through the plurality of passages 4A, into the compartment 36, where the pumping element 2, or rather the intake 2A of the pumping element 2, is present.

Preferably, the spatula 5 also features a second blade 5B.

The spatula 5 can rotate in the direction shown by the arrows R in the drawings.

The spatula 5 can support a flap 8, which is hinged along a first axis B that is essentially perpendicular to a rotation axis A of the spatula 5, a free end of the flap 8 facing the said base 4, almost in contact therewith, when the reservoir 3 is empty.

The flap 8 features a movable element 9 designed to cooperate with a fixed element 10 of a proximity sensor 20, so as to activate the proximity sensor 20 when the said free end of the flap 8 is positioned in proximity to the said base 4, therefore signalling when the lubricant L inside the reservoir 3 reaches a minimum level.

Advantageously, since the flap 8 is installed on the spatula, the former rotates with the latter and therefore moves cyclically away from and back to the fixed element 10 of the proximity sensor 20.

However, when the reservoir 3 is full of lubricant L (grease or slaked lime), when the flap 8 is rotating—with the spatula 5—in the grease or fluid grease, the said flap tilts the free end 8A thereof (where the mobile element 9 of the sensor 20 is positioned) away from the base 4, therefore moving out of the range of detection of the fixed element 10.

On the other hand, when the lubricant in the reservoir reaches a minimum level, the flap 8 no longer encounters resistance from the grease inside the reservoir and therefore arranges itself in a vertical position, moving the mobile element 9 of the sensor 20 towards to the base 4, and then, cyclically, towards the fixed element 10 of the sensor.

Essentially, when the flap 8 is in proximity to the vertical position (or is vertical, as in FIG. 4), the mobile element 9 comes, cyclically, within the range of detection of the fixed element of the proximity sensor 20, thereby triggering a minimum level signal.

It should be noted that the pump according to the present invention can also be used with lubricants which are less dense than grease or fluid grease, such as oil. Therefore, advantageously, the flap can be made of a material with a lower specific weight than that of oil, so as to float and therefore effectively detect when the minimum level is reached also if oil is used. A particularly suitable material can be NBR/Ebonite foam, advantageously of the closed-cell impermeable kind. One such material trades under the name of Spansil.

Alternatively, it is possible to couple a float to the flap, again to make detecting when the lubricant reaches the minimum level effective even with lubricants with different densities. Essentially, the flap 8 can be configured so as to float in a particularly fluid lubricant.

Figure 2:
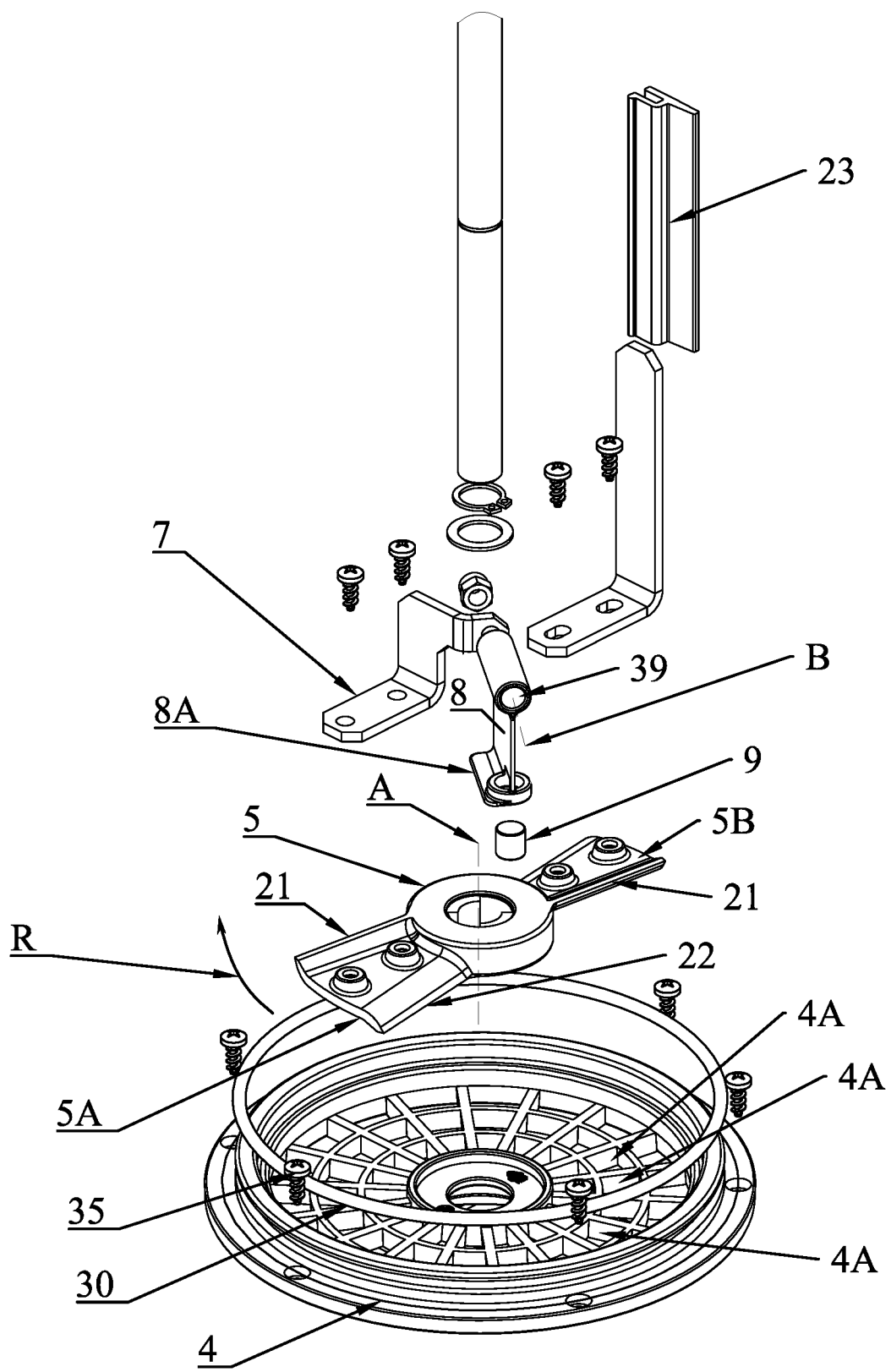
FIG. 2 is an enlarged view of certain details of the pump in FIG. 1.
Figure 3:
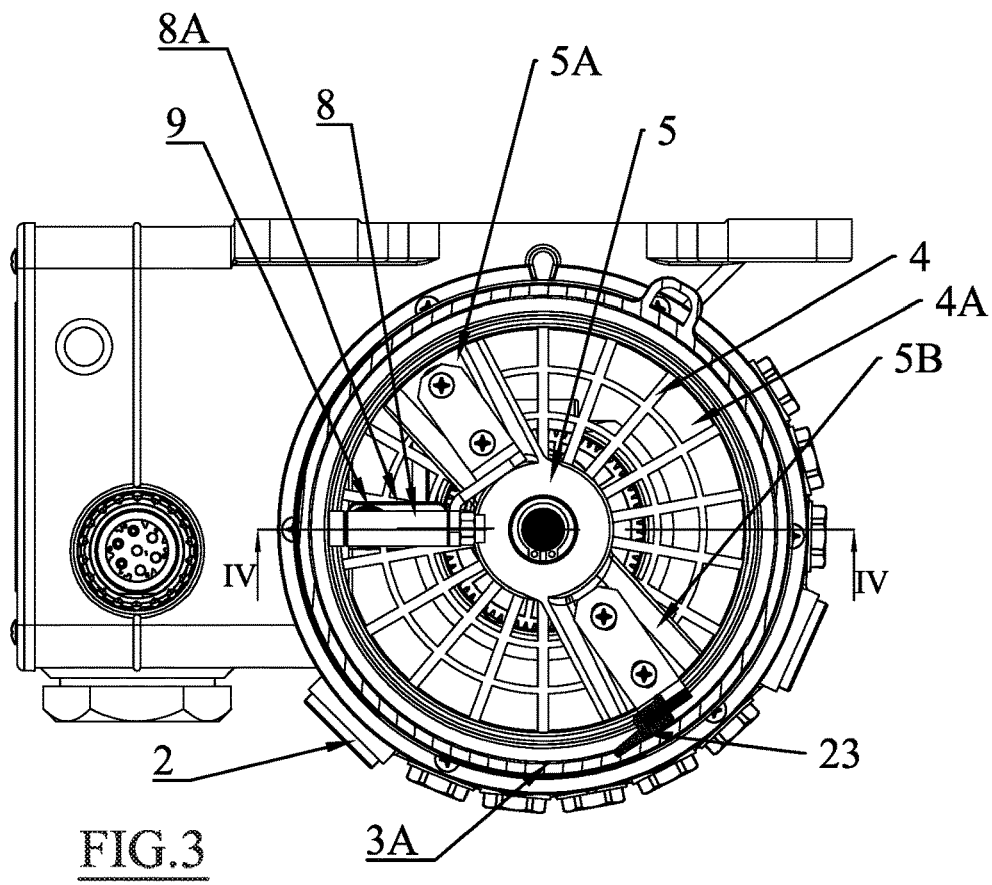
FIG. 3 is a section taken along the line III-III in FIG. 4.

As can be seen in FIG. 2, the flap 8 can be supported by the blade 5A. More specifically, a frame 7 can be featured, fastened to the blade 5A to which the flap 8 is hinged, for example by means of a screw 38 screwed onto the frame 7 and engaged in a tubular seat 39 in the said flap 8. Note that in FIG. 2 only the axis B of the screw 38 can be seen, which coincides with the axis of rotation (or the axis around which the flap 8 tilts).

When the reservoir 3 is empty, the free end of the flap 8 therefore faces a trailing edge 22 of the said blade 5A. Advantageously, the flap is positioned parallel to the trailing edge 22 of the blade 5A.

Preferably the width of the flap 8, at least at the said free end 8A, is similar (albeit smaller) to the width of the blade 5A.

To stabilise the flap 8, making it more effective in detecting when the lubricant reaches the minimum level, the end 8A of the flap can feature ballast. The ballast can be an additional element with respect to the flap 8, or it can be made by creating a thicker section of the constituent material, as shown in FIG. 2, so as to almost form a foot or plinth.

The movable element 9 of the proximity sensor 20 can be a magnet and the fixed element 10 can be a reed or Hall-effect sensor. Obviously, it will also be possible to use other kinds of proximity sensors, depending on the case.

In the case shown, the magnet has a cylindrical conformation and is housed (by interference fit) in a special cylindrical seat made at the free end of the flap.

Figure 4:
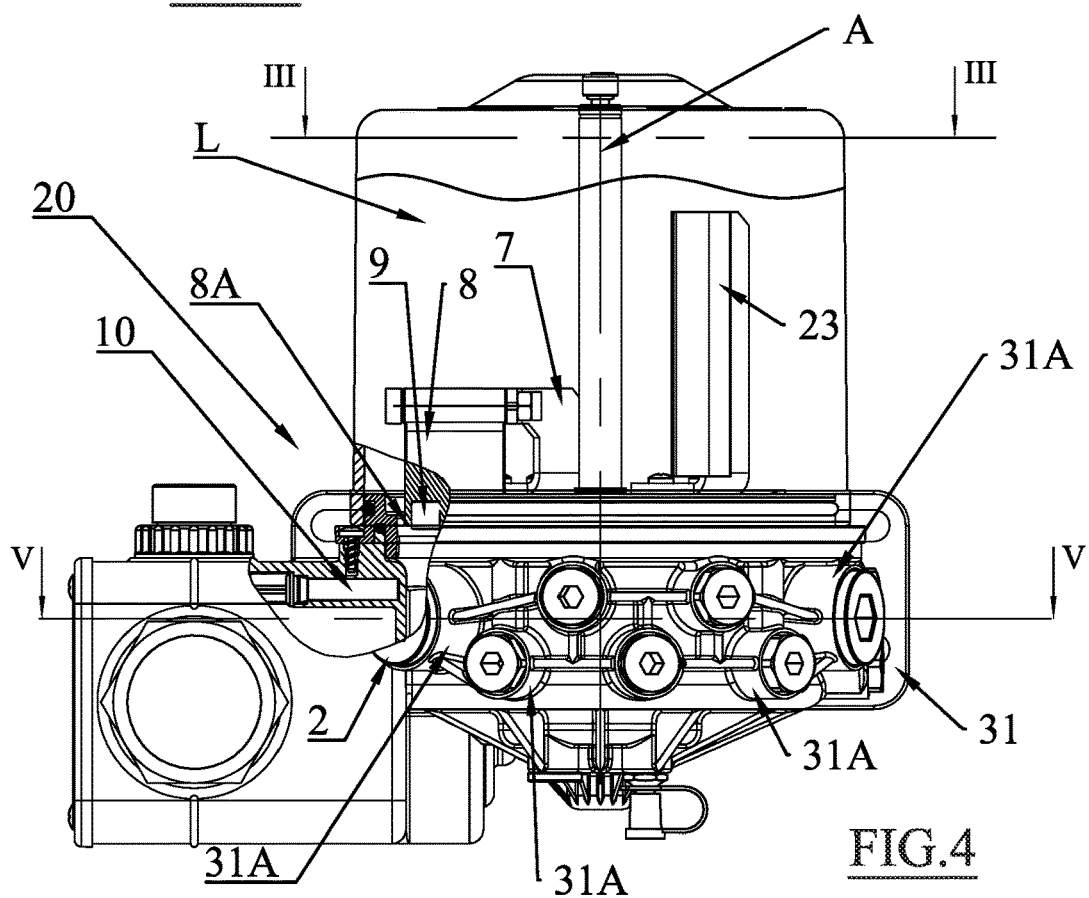
FIG. 4 is a side view of the pump in FIG. 1 assembled, with certain details shown in overlay, and with a partial section cut away along line IV-IV in FIG. 3.

As can be seen in FIG. 4, when the fixed element 10 detects the field generated by the mobile element 9, the sensor 20 sends a signal showing that the lubricant inside the reservoir has reached a minimum level.

Advantageously, the blade 5A features a leading edge 21 featuring a guide designed to convey the lubricant (as a result of the rotation of the blade) between the blade 5A (or rather a surface of the blade which is parallel to the base) and the said base 4.

Essentially, the guide on the leading edge 21 is formed of an inclined or curved surface that converges towards the base.

The configuration of the trailing edge 5A can be tapered and slightly curved towards the base so as to skim the lubricant so that the said lubricant is essentially flush with the said base 4, as well as to push the said lubricant into the passages 4A of the grid 4 with maximum effectiveness.

Essentially, with the blade 5A seen in section, the leading edge 21 has a convex surface facing the base 4, while the trailing edge 22 has a concave surface facing the base 4, with a skimming end. One part of the blade between the leading edge and the trailing edge may have a surface which is essentially parallel to that of the base.

This configuration of the spatula 5 (and the blade or blades thereof) effectively pushes the grease present in the reservoir into the compartment 36 underneath the base 4 through the passages 4A, almost extruding the lubricant therethrough. This ensures efficient emptying of the reservoir 3.

Furthermore, the described configuration of the spatula 5, results in the creation of a surface of the base 4 (in proximity to the trailing edge and when the lubricant is in the minimum level condition) which is almost perfectly devoid of lubricant and certainly devoid of lumps or accumulations which would prevent verticalisation of the flap 8, thereby preventing the triggering of the proximity sensor.

To end the description, it must be emphasised that the spatula 5 can feature two or more essentially identical blades 5A, 5B. The spatula 5, and specifically the second blade 5B, can support a scraper 23 designed to scrape (by rotating with the spatula) a lateral surface 3A of the reservoir 3.

Various embodiments of the innovation have been disclosed herein, but further embodiments may also be conceived using the same innovative concept.

The invention claimed is:

1. A pump (1) comprising a lubricant reservoir (3) which feeds at least one pumping element (2), the reservoir (3) being delimited by a base (4) at which, inside the reservoir (3) a rotating spatula (5) is provided, the spatula (5) being equipped with at least one blade (5A) which, by rotating over the base (4), conveys said lubricant towards an intake (2A) of said pumping element (2) pushing it through a plurality of passages (4A) made on the surface of said base (4), the pump having a flap (8) hinged along a first axis (B) substantially perpendicular to an axis (A) of rotation of the spatula (5), a free end of the flap (8) facing said base (4), the flap (8) providing a movable element (9) able to cooperate with a fixed element (10) of a proximity sensor (20), so as to activate the proximity sensor (20) when said free end of the flap (8) approaches said base (4) thus signaling a minimum level of lubricant (L) inside the tank (3), said flap (8) being supported by said spatula (5).

2. The pump (1) according to claim 1, wherein said flap (8) is supported by said blade (5A).

3. The pump (1) according to claim 1, wherein, at least when the tank (3) is empty, the free end of said flap (8) faces a trailing edge of said blade (5A), the width of said flap (8) at least in correspondence with said free end (8A) being but smaller than the width of said blade (5A).

4. The pump (1) according to claim 1, wherein said end (8A) of the flap provides a ballast.

5. The pump (1) according to claim 1, in which the movable element (9) of the proximity sensor (20) is a magnet and the fixed element (10) is a reed or hall effect sensor.

6. The pump (1) according to claim 1, wherein said blade (5A) has a leading edge (21) equipped with a slope adapted to convey, with the rotation of the blade, the lubricant between the blade (5A) and the base (4).

7. The pump (1) according to claim 1, wherein said blade (5A) provides a trailing edge (22) substantially adapted to scrape the lubricant substantially flush with said base (4).

8. The pump (1) according to claim 1, wherein the spatula (5) supports a scraper (23) adapted to scrape a lateral surface (3A) of the tank (3).

9. The pump according to claim 1, in which the plurality of passages (4A) are substantially grid-shaped.

10. The pump (1) according to claim 1, wherein said pumping element (2) is operated by an eccentric element (24) torsionally integral with said spatula (5).

11. The pump (1) according to claim 1, in which the flap (8) is configured to float in said lubricant, being at least partially made of a material with a specific weight lower than that of said lubricant.

* * * * *